(12) United States Patent
Hanes

(10) Patent No.: US 10,482,877 B2
(45) Date of Patent: Nov. 19, 2019

(54) REMOTE SENSOR VOICE RECOGNITION

(71) Applicant: HEWLETT-PACKARD DEVELOPMENT COMPANY, L.P., Houston, TX (US)

(72) Inventor: David H. Hanes, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/754,270

(22) PCT Filed: Aug. 28, 2015

(86) PCT No.: PCT/US2015/047376
§ 371 (c)(1),
(2) Date: Feb. 21, 2018

(87) PCT Pub. No.: WO2017/039575
PCT Pub. Date: Mar. 9, 2017

(65) Prior Publication Data
US 2018/0240457 A1    Aug. 23, 2018

(51) Int. Cl.
G10L 15/20    (2006.01)
G10L 15/28    (2013.01)
G10L 21/0208    (2013.01)
G10L 17/22    (2013.01)

(52) U.S. Cl.
CPC .............. *G10L 15/20* (2013.01); *G10L 15/28* (2013.01); *G10L 17/22* (2013.01); *G10L 21/0208* (2013.01)

(58) Field of Classification Search
CPC ......... G10L 15/20; G10L 15/28; G10L 17/22; G10L 21/0208
See application file for complete search history.

(56) References Cited

U.S. PATENT DOCUMENTS

| | | | |
|---|---|---|---|
| 8,738,382 B1* | 5/2014 | Herz | G06F 3/167 |
| | | | 704/233 |
| 8,836,500 B2 | 9/2014 | Houvener et al. | |
| 8,971,543 B1 | 3/2015 | List | |
| 9,336,767 B1* | 5/2016 | Barton | G10K 11/16 |
| 9,462,399 B2* | 10/2016 | Bharitkar | H04H 60/33 |
| 9,898,250 B1* | 2/2018 | Williams | G06F 3/167 |
| 2003/0013503 A1* | 1/2003 | Menard | H04M 1/0291 |
| | | | 455/569.2 |
| 2003/0061039 A1 | 3/2003 | Levin | |
| 2003/0069727 A1 | 4/2003 | Krasny et al. | |
| 2004/0170293 A1* | 9/2004 | Watson | B60R 1/12 |
| | | | 381/365 |
| 2005/0086058 A1 | 4/2005 | Lemelson et al. | |

(Continued)

FOREIGN PATENT DOCUMENTS

EP    1496499 A2    1/2005
JP    2007292814 A    11/2007

OTHER PUBLICATIONS

Creative.Com; Sound Blasteraxx Axx 200; Website.

(Continued)

*Primary Examiner* — Mohammad K Islam
(74) *Attorney, Agent, or Firm* — Michael A. Dryja

(57) ABSTRACT

Examples described herein include systems, methods, and devices for transmitting a media signal to the remote sensor, receiving a sound signal from the remote sensor, and monitoring the sound signal and the media signal to recognize voice commands.

4 Claims, 5 Drawing Sheets

(56) References Cited

U.S. PATENT DOCUMENTS

| | | | | |
|---|---|---|---|---|
| 2005/0146445 A1* | 7/2005 | Sleboda | ................ | G01C 21/26 340/988 |
| 2005/0152557 A1* | 7/2005 | Sasaki | ................ | H04S 7/302 381/58 |
| 2006/0276230 A1* | 12/2006 | McConnell | ......... | H04M 3/4938 455/563 |
| 2008/0273716 A1* | 11/2008 | Saito | ................ | H04M 9/082 381/93 |
| 2009/0192638 A1* | 7/2009 | Van Leest | ................ | H04R 3/12 700/94 |
| 2011/0286600 A1* | 11/2011 | Gosior | ................ | A63F 13/12 381/2 |
| 2014/0314261 A1* | 10/2014 | Selig | ................ | H04R 25/50 381/314 |
| 2015/0082175 A1* | 3/2015 | Onohara | ................ | G06F 3/167 715/728 |
| 2015/0179181 A1* | 6/2015 | Morris | ................ | G10L 19/012 704/226 |
| 2015/0179184 A1* | 6/2015 | Cudak | ................ | G10L 21/0208 704/233 |
| 2015/0238819 A1* | 8/2015 | Volkerink | ................ | H04W 4/70 482/4 |
| 2016/0105691 A1* | 4/2016 | Zucchetta | .......... | H04N 21/2143 725/82 |
| 2016/0173049 A1* | 6/2016 | Mehta | ................ | H03G 3/32 381/57 |
| 2016/0378427 A1* | 12/2016 | Sharma | ................ | G10L 19/018 700/94 |
| 2018/0189278 A1* | 7/2018 | Garmark | ................ | G06F 3/167 |

OTHER PUBLICATIONS

Etherington, D.; Amazon Echo is a $199 Connected Speaker Packing an Always-On Siri-Style Assistant, Article, Nov. 6, 2014.

N/A; Could Sony's Smart Bluetooth Speaker BSP60 Be Your Next Personal Assistant; Article, Home Tech Reviews.

\* cited by examiner

REMOTE SENSOR VOICE RECOGNITION

BACKGROUND

Voice control of computers and other devices in home and office environments is a useful way of implementing remote control of various devices without the use of a manual remote control device. To implement voice control, various systems implement sophisticated voice recognition routines that can decipher natural language and use situational context to inform the recognition of voice commands. Such voice recognitions routines can be computationally intensive.

DETAILED DESCRIPTION

Implementations of the present disclosure include systems, methods, and devices for processing sound signals received from a remote speaker device that includes a microphone. The speaker device can establish a bidirectional link with the computer system executing voice recognition and other functionality. Sound signals corresponding to sounds detected by the microphone can be sent back to the computer system for processing and/or recognizing voice commands.

For example, a computing system can instantiate a media server or other multimedia application and then transmit a media signal generated by the media server or multimedia application to the remote speaker device. The remote speaker device can then generate audio sounds based on the media signal. As described herein, the remote speaker device can also include a microphone that can continually monitor ambient sounds in the vicinity of its location.

In scenarios in which the remote speaker device is currently playing audio based on the received media signal, the ambient sounds can include the audio from the media signal (e.g., music, talk radio, movie soundtrack, etc.). The microphone in the remote speaker device can detect the ambient sounds and transmit a corresponding sound signal back to the computing device. In implementations of the present disclosure, the computing device can include functionality for analyzing the sound signal in view of the transmitted media signal to help isolate potential voice commands from the component of the ambient sounds attributable to the media signal. For example, the computing device can reference the media signal it is transmitting to subtract it from the sound signal it receives from the remote speaker device.

In some implementations, the computing device can apply a time shift or a delay to the transmitted media signal. The time shift can correspond to the total delay associated with transmitting the media signal to the remote speaker device, playing the media signal through speaker device, and/or receiving the sound signal back from the remote speaker device. The time shift can be applied to the audio signal component of the media signal. The time shifted audio signal can then be subtracted from the sound signal. In such implementations, the audio associated with the media signal can be effectively removed from the sound signal to assist in isolating and clarifying any possible voice commands detected in the ambient sound. The processed sound signal can then be analyzed by a voice-recognition functionality to detect, recognize, and react to voice commands detected by the remote speaker device.

Various aspects of the present disclosure are illustrated in examples depicted in the accompanying figures and described in the detailed description. The examples presented herein are meant to be illustrative only and are not intended to restrict the scope of the disclosure or the claims.

Figure 1:
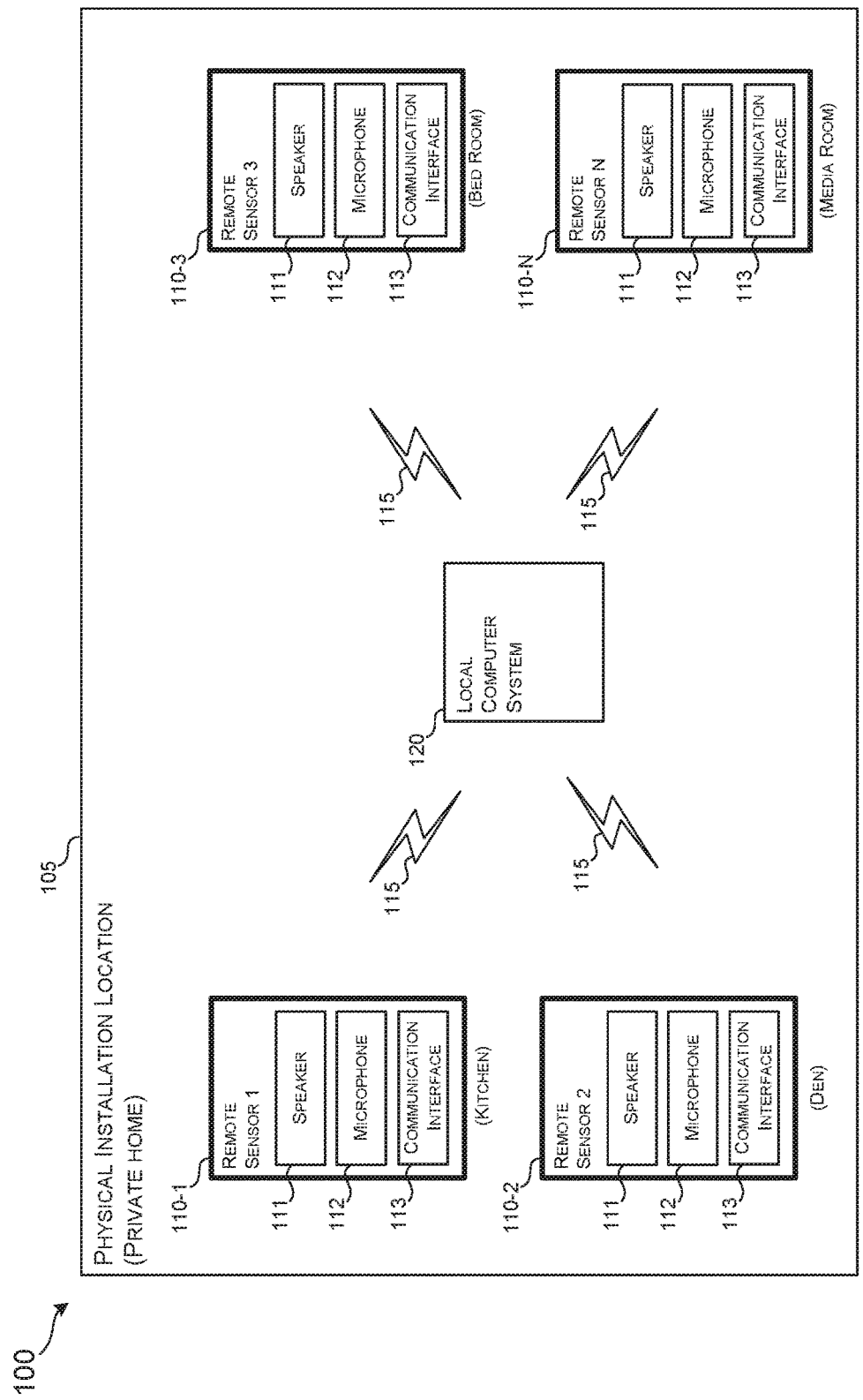
FIG. 1 is a block diagram of an example remote sensor voice recognition system.

FIG. 1 depicts an example of a system 100 for processing ambient sounds using a local computer system 120 and remote sensors 110. As shown, the local computer system 120 and the remote sensors 110 can be disposed in various locations within a particular physical installation location 105. For example, the physical installation location 105 can include any type of location, such as a home, an office, a campus, a laboratory, and the like.

The local computer system 120 can include any type of computing device. For example, the local computer system 120 can be implemented as any type of computing device, such as a desktop computer, and all-in-one computer, a tablet computer, a laptop computer, and the like. In various implementations, the local computer system 120 can include a processor, a memory, and a network or communication interface. Accordingly, local computer system 120 can instantiate an operating system. Under the direction of the operating system, the local computer system 120 can execute or instantiate a media player, a sound signal analyzer, and/or a voice recognizer for interpreting detected voice commands. The functionality of the media player, the sound signal analyzer, and the voice recognizer are described in more in reference to FIGS. 2 through 5 below.

In the example shown in FIG. 1, the physical installation location 105 can include as many as N, where N is an integer, remote sensors devices 110. In some implementations, each one of the remote sensors 110 can be identical. However, in other implementations, the remote sensors 110 can include different configurations of speakers and microphones from different manufacturers. As used herein, the terms "remote speaker device" and "remote sensors" are used interchangeably to refer to any device that includes a microphone, or other sound sensor, that can be deployed in a physical location 105 and communicate sound signals electronically with a local computer system. In various implementations described herein, remote sensors 110 can also include a speaker with which the remote sensor 110 can generate sounds based on information or signals received from the local computer system 120 or other device (e.g., a smart phone, tablet computer, laptop computer, remote server computer, etc.). Accordingly, in implementations in which a remote sensor 110 includes a speaker and a microphone, the remote sensor can include functionality for bidirectional communication with the local computer system 120.

In one example, the remote sensors 110 can include a speaker 111, a microphone 112, and/or a communication interface 113. The communication interface 113 can receive a media signal from local computer system 120. The media signal can include any information from which the remote sensor 110 can generate a corresponding sound using its speaker 111. The media signal can include an analog or digital signal that the remote sensor 110 can use with or without transformation or decoding to produce sounds (e.g., music, speech, sound effects, tones, sound effects, etc.). For example, a media signal can include information that corresponds to data stored in various types of compressed and uncompressed media and audio files, such as, moving pictures expert group formats, (e.g., MPEG-1, MPEG-2 Audio Layer III, also known as MP3), waveform audio file format (WAV), Windows™ media audio (WMA), WavPack, and the like. The remote sensor 110 and/or the local computer system 120 can use or process the media signal to generate an audio signal usable to drive components of the speaker to generate sounds. As used herein, the term "audio signal" is used to refer to any representation of a sound. In some implementations, the audio signal can include modulations of voltages with frequencies of roughly 20 Hz to 20 kHz. In other implementations, the audio signal can include digital representations of the frequency modulations in a sound.

As described herein, the communication interface 113 can include functionality for sending and receiving signals over a communication media using a corresponding communication protocol. In the example shown in FIG. 1, the communication interface 113 includes a communication device that can communicate through signals 115 with the local computer system 120. In some implementations, the physical installation location 105 can include a wireless network implemented in compliance with any type of wireless networking media and protocol, such as IEEE 802.11. Accordingly, signals 115 can include wireless network communication signals. The wireless communication between the remote sensor 110 and the local computer system 120 may also be implemented using an IEEE 802.15.1 short range or near field wireless communication protocol. In other implementations, signals 115 can be transmitted through a cable or a wire. As such, any of the remote sensors 110 can be coupled to the local computer system 120 by a wired networking communication system, such as Ethernet.

Figure 2:
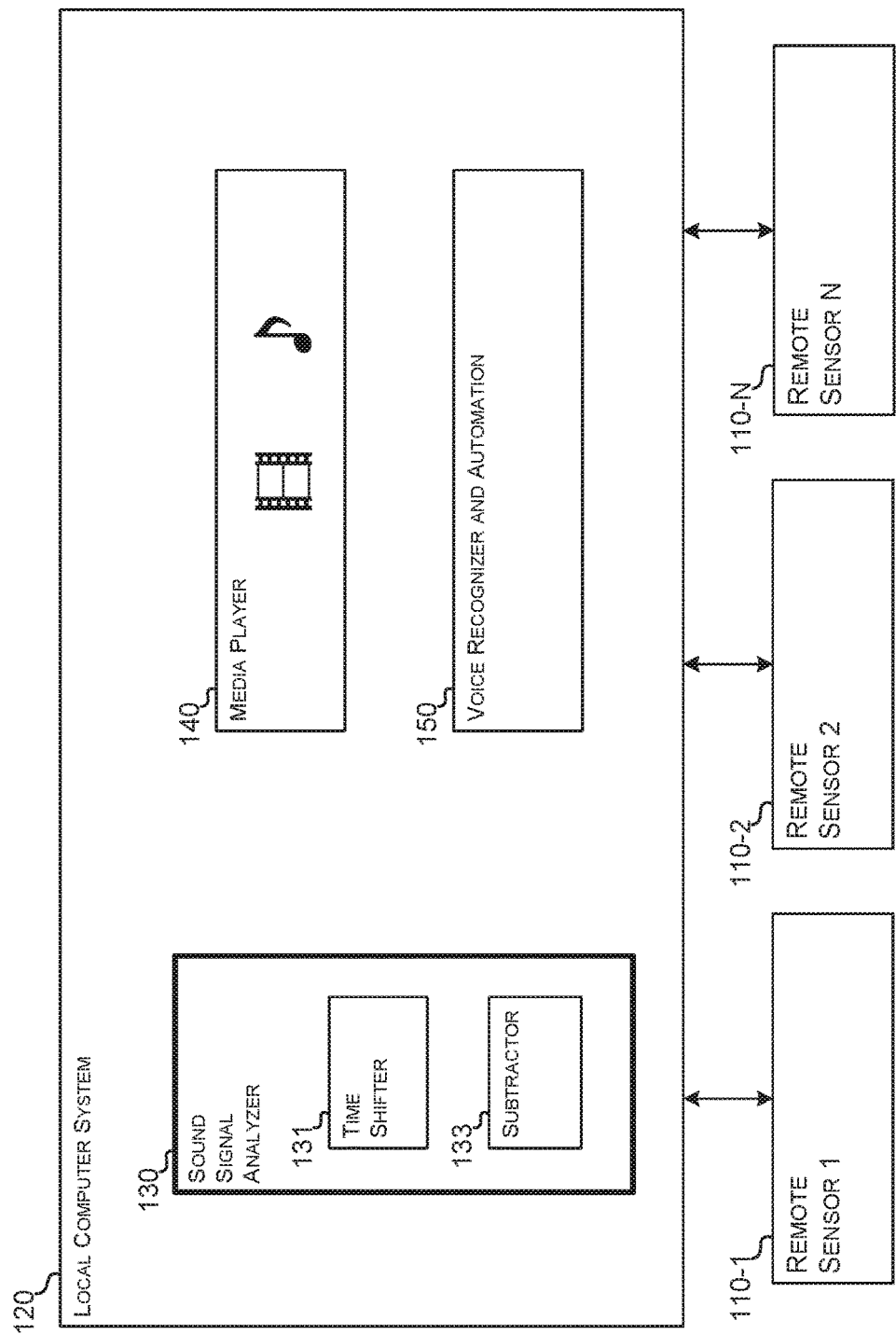
FIG. 2 illustrates a detailed schematic of an example local voice-recognition system that uses remote sensors.

FIG. 2 depicts a more detailed schematic of the local computer system 120. As shown, the local computer system 120 can include a sound signal analyzer 130, a media player 140, and voice recognizer and automation functionality 150. Each of the components of local computer system 120 described herein can be implemented as any combination of hardware and executable code. For instance, the sound signal analyzer 130, media player 140, and the voice recognizer and automation functionality 150 can be implemented as standalone applications or elements of an operating system in the form of executable code that includes instructions that when executed by the processor cause the processor to perform the operations described herein.

The media player 140 can include functionality to generate and transmit media signals to the communication interface 113 for playback on a speaker 111 of remote sensor 110. For example, the media player 140 can include functionality for decoding music, audio, or video signals or files to generate corresponding media signals. The local computer system 120 can be linked to the communication interface 113 of the remote sensor 110-1 using a Bluetooth™ connection through which media player 140 can transmit the media signals to the remote sensor 110-1. As used herein, the terms "media signal" and "media file" can refer to any type of electronic signal or electronic file that includes an audio signal component from which sound can be reproduced.

In various implementations, the media player 140 can access media files stored on a local hard drive or receive media signals from a streaming media server remote to the local computer system 120. The media player 140 can decode the files or signals to generate a corresponding media signal that can be sent to a remote sensor 110 on a corresponding communication link. The media player 140 can transmit the generated media signal, through a communication interface of the local computer system (not shown in FIG. 2), to a selected remote sensor 110 that can use the signal to reproduce corresponding sounds. The selected remote sensor 110 receiving the media signal can play sounds corresponding to the media signal using its speaker 111. Accordingly, a remote sensor 110 can include logic and power components for converting the media signal into sounds played back on the speaker 111.

Referring back to FIG. 1, the example remote sensors 110 are shown to include a microphone 112. The remote sensors 110 can use the microphone 112 to detect sounds. In one example implementation, the remote sensors 110 can use the included microphones 112 to monitor the ambient sound in the vicinity of the particular remote sensor 110. For example, the microphone 112 in remote sensor 110-1 can be located in the kitchen of a home. As such, the microphone 112 can detect sounds in the kitchen (e.g., people talking in the kitchen) and any other ambient sounds that may be detectable from the kitchen (e.g., sounds of a television playing in a family room adjacent to the kitchen). In various scenarios, a remote sensor 110, such as remote sensor 110-1, can play music in response to a media signal received from the local computer system 120. In such situations, the ambient sounds detected by the microphone 112 can include the sounds of the music played by the speaker 111 in the same remote sensor device 110.

Similarly, in implementations in which the physical installation location 105 includes multiple remote sensors 110, as illustrated in FIG. 1, the microphone 112 in a first remote sensor 110 may detect sound emitted from a speaker 111 in a second remote sensor 110 generated in response to a media signal sent by the local computer system 120 specifically to the second remote sensor 110. In other words, the local computer system 120 can selectively play different sounds on different remote sensors 110 simultaneously. For example, remote sensor 2 110-2 can play music and monitor the ambient noise in the den of a home. The remote sensor 3 110-3 can play different music and monitor ambient noise in the bedroom of the home. Meanwhile, the remote sensor 110-N can be playing the sound track of a movie and monitoring the ambient sounds in the media room of the home. Depending on the proximity to one another, one remote sensor 110 may detect the sounds emitted by another remote sensor 110 as part of the ambient sounds. The sounds detected by microphones 112 in corresponding remote sensors 110 can be transmitted back to the local computer system 120 through the corresponding communication link as sound signals. When received by the local computer system 120, functionality included in the sounds analyzer 130 can process the sound signals to help isolate the ambient sounds detected by the microphone 112 from the sounds generated by speakers 111 in the same remote sensor 110 or another remoted sensor 110.

As shown in FIG. 2, the sound signal analyzer can include various functionality for processing a sound signal received from the remote sensor 110. Processing the sound signal can include analyzing the sound signal to remove any aspects of a media signal played on any of the speakers 111 and detected by the microphone 112 in a particular remote sensor 110 to clarify or isolate any detected voice commands. In one example, the sound signal analyzer 130 can access a media signal generated by the media player 140 to identify sounds that may be included in the sound signal. Identification of the sounds may include identifying a media signal sent to the particular remote sensor 110 from which the sound signal is received or identifying a media signal sent to another remote sensor 110 in the physical installation location 100. Identifying a media signal corresponding to sounds that the microphone 112 in the particular remote sensor 110 may be detecting can inform further analysis and processing of the sound signal.

In one example implementation, the sound signal analyzer 130 can include a time shifter 131. The time shifter 131 can analyze the received sound signal and any concurrently played media signals generated by the media player 140 to recognize similar audio signals and determine any temporal offset. For example, if the time shifter 131 determines that the sound signal includes an audio signal that matches an audio signal included in a media signal generated by the media player 140, it can determine a delay or time shift, if any, in the two similar audio signals. If a delay between the audio signal in the media signal and the audio signal in the sound signal exists, then the time shifter 131 can apply a corresponding time shift to the received sound signal.

The magnitude of the time shift can correspond to the duration of the delay between transmission of the audio signal in the media signal and the detection of the audio signal in the sound signal. In various implementations, the length of the delay between the two audio signals can correspond to any delay associated with transmitting the media signal from the local computer system 120 to the particular remote sensor 110, then receiving the sound signal from the remote sensor, and/or any other transmission or processing time. In various imitations, the time shift can be represented by a time value in any suitable measurable units, such as a nanosecond, microsecond, millisecond, and the like.

For example, the time shift can correspond to the amount of time it takes the local computer system 120 to transmit an audio signal that includes a song to the remote sensor 2 110-2 in the den plus the time it takes the remote sensor 2 110-2 to process the audio signal, play the music, detect the ambient sound that includes the music, encode the ambient sound into a sound signal, and transmit the sound signal back to the local computer system 120. The magnitude of the time shift can also include the time it takes the time shifter 131 to determine that the received sound signal includes the song. The time shifter 131 can then provide a time value corresponding to the time shift to the subtractor 133.

The subtractor 133 can shift the audio signal received from the media player 140 by the time value, or approximately the time value, before subtracting the audio signal from the sound signal received from a remote sensor 110. In such implementations, once the audio signal is subtracted from the sound signal, the resulting processed sound signal more closely represents the ambient sounds detected by the microphone 112 in the remote sensor 110 with the sound corresponding to the audio signal from the media signal (e.g., music, soundtracks, speech, etc.) having been removed. The processed sound signal isolates the ambient sound detected by the microphone 112 that may include detectable voice commands.

The sound signal analyzer 130 can then pass the processed sound signal to the voice recognizer and automation 150 for further analysis. For example, the voice recognizer and automation 150 can analyze patterns in the process sound signal to determine the presence of recognized voices and/or voice commands. When the voice recognizer and automation 150 recognizes a voice command, it can initiate specific operations in the local computer system 120 and/or in other connected devices within the physical installation location 105.

For example, the voice recognizer and automation 150 can detect a command input specific parameters into a particular application executable local computer system 120. In one particular example, the voice command "play classical music", can cause the voice recognizer and automation 150 to send the command to play classical music to the media player 140. In response to the command "play classical music", the media player 140 can play songs associated with the genre classical music. Similarly, in response to the command "lock all doors", the voice recognizer and automation 150 can cause a home automation application executed or instantiated on local computer system 120 to send appropriate automation signals to networked locks on the doors of the physical installation location 105 that cause them to lock.

Figure 3:
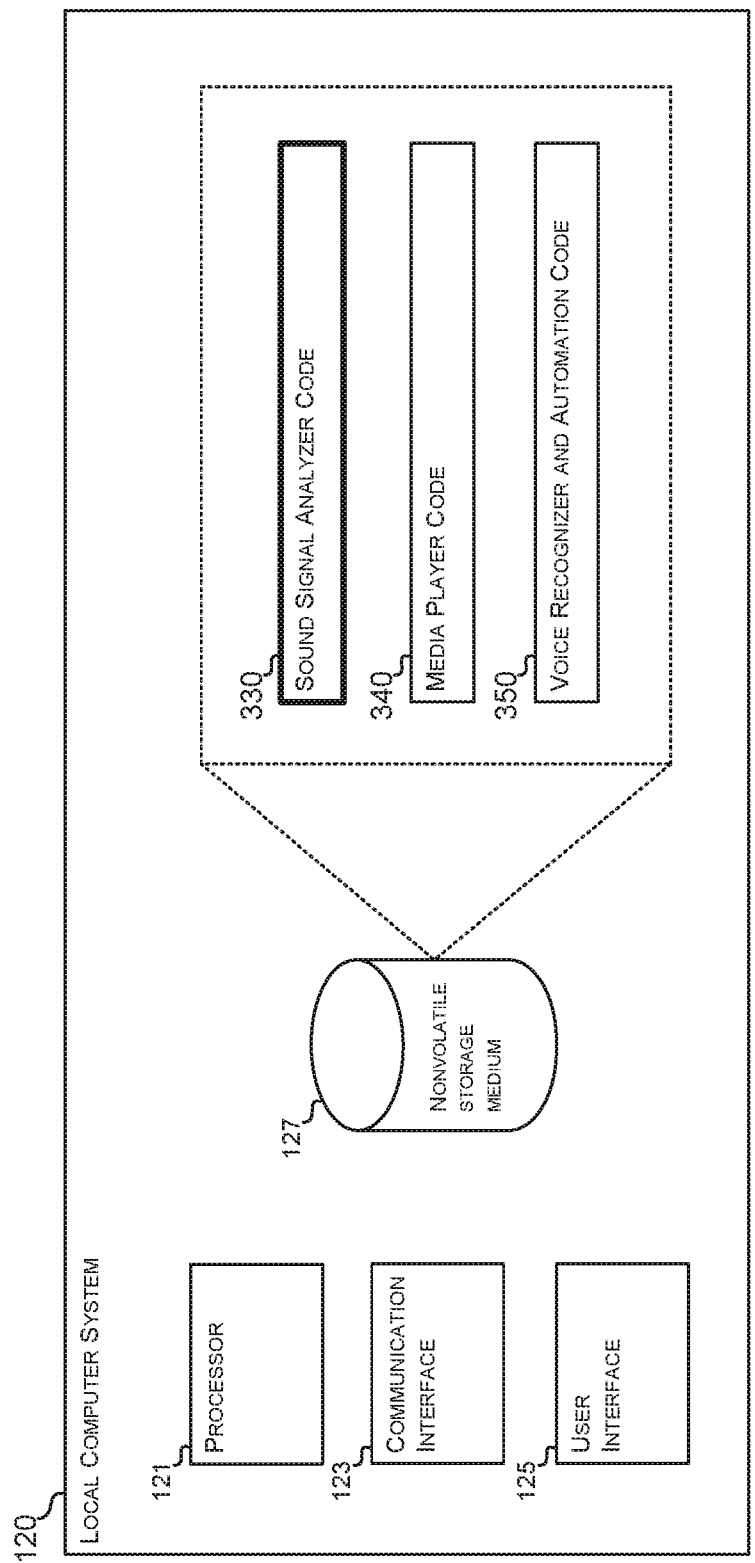
FIG. 3 illustrates an example local voice-recognition computer system.

FIG. 3 depicts a detailed schematic of an example local computer system 120 in which various examples of the present disclosure can be implemented. As shown, the local computer system 120 can include a processor 121, a communication interface 123, a user interface 125, and a memory 127.

As described herein, various examples of the present disclosure can be implemented as computer executable code executed by processor 121. In such implementations, the computer executable code can be stored on the memory 127. For example, the functionality of the sound signal analyzer 130 can be implemented as executable sound signal analyzer code 330 executed in a processor 121 of local computer system 120. The executable code, stored on a nonvolatile computer readable medium, can include instructions for operations that when executed by processor 121 causes the processor 121 to implement the functionality described in reference to the sound signal analyzer 130 and/or its sub-components. Similarly, the functionality of media player 140 and voice recognizer and automation 150 can be implemented as executable media player code 340 and voice recognizer and automation code 350, respectively.

Accordingly, the sound signal analyzer 130, media player 140, and/or voice work manager and automation 150 can be implemented in local computer system 120 comprising processor 121, communication interface 123, user interface 125, memory 127, and/or other digital or analog logic circuits that can be used to store and/or execute operations defined by executable code or code segments.

The processor 121 of the local computer system 120 may be a microprocessor, a micro-controller, an application specific integrated circuit (ASIC), or the like. According to an example implementation, the processor 121 is a hardware component, such as a circuit.

The communication interface 123 can include any type of wired or wireless communication hardware for sending and receiving communication signals using corresponding communication media and protocols. For example, the communication interface 123 can include an Ethernet card to communicate with other electronic devices, such as remote sensors 110, coupled to an Ethernet infrastructure in the physical installation location 105. In other examples, the communication interface 123 can include a Wi-Fi™, Bluetooth or other wireless communication protocol compliant transceiver and support electronics for communicating with other electronic devices, such as remote sensors 110, wirelessly.

The user interface 125 may include any combination of user input and/or displayed devices. For example, user interface 125 may include a combination of a keyboard, mouse, and computer monitor. In other examples, the user interface 125 may include a touchscreen through which information can be displayed and user input can be accepted. In other implementations, the user interface 125 may include a Web server that can be accessed remotely by a client device (e.g., a tablet computer, smart phone, laptop computer, etc.) executing a corresponding client application (e.g., a web browser or a companion application or "app"). User interface 125 may also include functionality for generating a graphical user interface (GUI) through which a user can input preferences, settings, and/or commands corresponding to the execution of the sound signal analyzer code 330, media player code 340, and voice recognizer and automation code 350, and other functionality of the local computer system 120.

The memory 127 can include any type of transitory or non-transitory computer readable medium. For example the memory 127 can include volatile or non-volatile memory, such as dynamic random access memory (DRAM), electrically erasable programmable read-only memory (EEPROM), magneto-resistive random access memory (MRAM), memristor, flash memory, floppy disk, a compact disc read only memory (CD-ROM), a digital video disc read only memory (DVD-ROM), or other optical or magnetic media, and the like, on which executable code may be stored.

Figure 4:
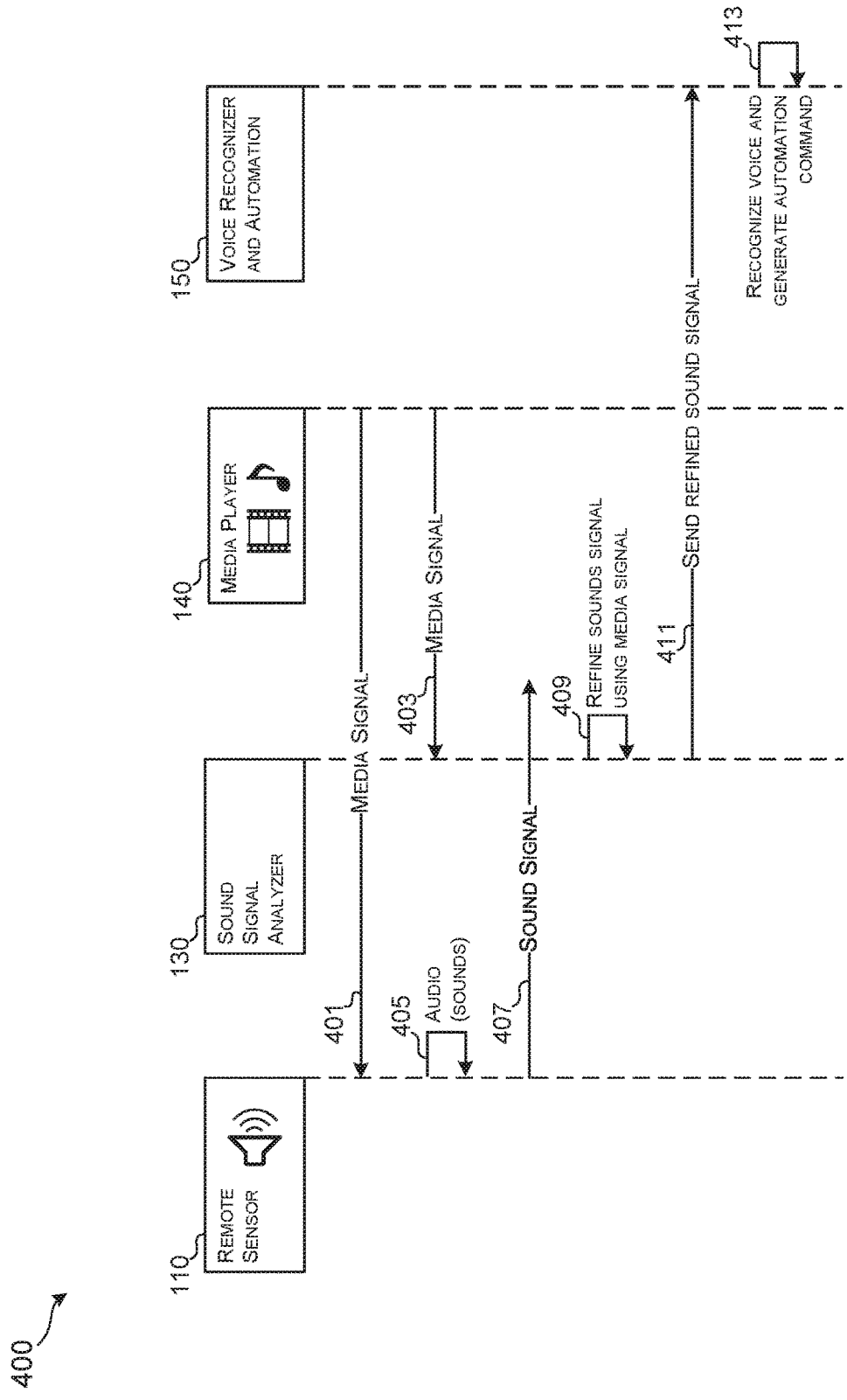
FIG. 4 depicts an example dataflow for recognizing voice commands received from a remote sensor.

FIG. 4 depicts an example dataflow 400 for analyzing sounds detected by the remote sensor 110 to isolate potential voice commands. In the example shown, the media player 140 can generate and transmit a media signal 401 to remote sensor 110. As described herein, the media player 140 can include an application executed on a local computer system 120 that translates or decodes various media (e.g., movie files, music files, audiobooks, etc.) into a media signal 401 that the remote sensor 110 can decode and then playback as a sound using a component speaker 111. Accordingly, the remote sensor 110 can be implemented as a wireless speaker device that integrates a speaker 111, a microphone 112, and communication interface 113. For example, the remote sensor 110 can be a Bluetooth™ speaker device in wireless communication with the local computer system 120 on which the media player 140 is instantiated.

While the media player 140 is transmitting the media signal 401 to the remote sensor 110, the media player 140 can send and/or the sound signal analyzer 130 can receive a version of the media signal 403. In some implementations, the media signal 401 and the media signal 403 can be identical. However, in other implementations, the media signal 401 can be different from the media signal 403. For example, the media signal 401 can be encoded according to a protocol compatible with the remote sensor 110, while the media signal 403 received by the sound signal analyzer 130 can be in the native format access by the media player 140. For example, the media signal 403 can include the media file from which the media player 140 generates the media signal 401.

When the remote sensor 110 receives the media signal 401, it can generate audio 405 corresponding to the media signal 401. For example, the media signal may include an audio signal component that represents the audio of a song. Accordingly, the remote sensor 110 can generate the audio 405 that includes sounds corresponding to the song.

While the remote sensor 110 is generating the audio 405, it can also detect the ambient sounds within a corresponding detection range using its component microphone 112. Sound detected by the microphone 112 in the remote sensor 110 can be converted and sent back to the sound signal analyzer 130 as a sound signal 407. In scenarios in which the remote sensor 110 is playing audio sounds on its component speaker 111, the sound signal 407 may include sounds emitted by the speaker 111 and detected by the microphone 112. For example, the microphone 112 may detect music emitted from the speaker 111 corresponding to an audio signal in the media signal 401.

When the sound signal analyzer 130 receives the sound signal 407 from the remote sensor 110, it can refine the sound signal using the media signal 403 at reference 409. In various imitations, refining the sound signal 407 can include processing the sound signal 407 in view of information in the media signal 403. In one implementation, the sound signal analyzer 130 can determine a time delay between the time that the media player 140 transmits the media signal 401 to the remote sensor 110 and the time that the sound signal analyzer 130 receives the sound signal 407. The magnitude of the time delay can then be used to shift an audio signal contained in the media signal 403 to generate a shifted audio signal. The sound signal analyzer 130 can then subtract the shifted audio signal from the sound signal 407 to remove ambient sounds detected by the microphone 112 in the remote sensor 110 attributable to sounds generated by the microphone 112 corresponding to the audio signal in the media signal 401.

Such implementations can effectively cancel out or remove any sounds that the remote sensor 110 is generating to help isolate ambient sounds detected by the remote sensor 110 that may include voice commands on which the voice recognizer and automation 150 may act. For example, if a song in media signal 401 is being played on the speaker 111 and detected by the microphone 112 in remote sensor 110, the sounds of the song can be subtracted from the sound signal 407 based on information in the media signal 403. The subtraction of the audio signal in the media signal 403 from the sound signal 407 can effectively cancel out the sounds of the song detected in the ambient song in the vicinity of the remote sensor 110.

In other implementations, sound signals received from a particular remote sensor 110 (e.g., remote sensor 110-2 in the den) may include the sounds generated by other remote sensors 110 (e.g., remote sensor 110-1 in the kitchen and/or remote sensor 110-N in the media room) based on corresponding media signals transmitted by the media player 140. In such scenarios, implementations of the present disclosure can detect audio signals in the sound signal that match audio signals from the corresponding media signals transmitted to the other remote sensors 110. As such, multiple audio signals corresponding to multiple media signals can be subtracted from the sound signal received from a particular remote sensor 110 to refine the sound signal and/or isolate potential voice commands from ambient sounds that can include sounds played by other remote sensors 110. For example, the remote sensor 110-2 in the den can detect sounds of a movie played on the remote sensor 110-N in the media room, sounds of music played on the remote sensor 110-1 in the kitchen, and news radio sounds played on the remote sensor 110-3 in the bedroom. The sound signal analyzer 130 can subtract the audio signals corresponding to the media signals sent to remote sensors 110-1, 110-3, and 110-N from the audio signal received from the remote sensor 110-2 to help isolate potential voice commands.

At reference 411, the sound signal analyzer 130 can send the processed and/or refined sound signal to the voice recognizer and automation 150. In various implementations, the refined sound signal sent to the voice recognizer and automation 150 can include a sound signal that corresponds to the ambient sounds detected by the microphone 112 in the remote sensor 110 with some or all of the sounds attributable to the media signal 401 removed. In response to the refined sound signal, the voice recognizer and automation 150 can analyze the refined sound signal to recognize a voice commands and generate corresponding automation commands at reference 413. The commands recognizable by the voice recognizer and automation 150 can include any operations executable by the local computer system 120. For example, the voice recognizer and automation 150 can recognize commands to operate the media player 140, home automation controllers, text entry, and the like. In some implementations, the voice recognizer and automation 150 can be implemented as a standalone application executed on the local computer system 120. In other implementations, the voice recognizer and automation 150 can be implemented as a component of an operating system executed on the local computer system 120.

Figure 5:
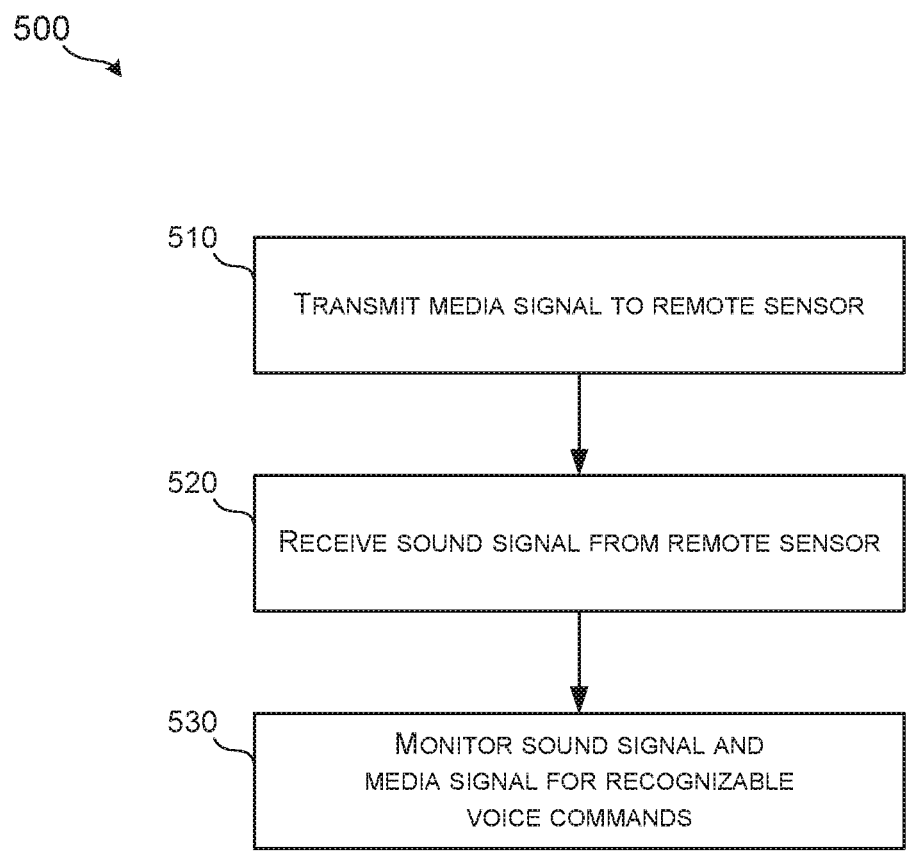
FIG. 5 is a flowchart of an example method for detecting voice commands.

FIG. 5 is a flowchart of an example method 500 operating a local computing system 120 to isolate voice commands from ambient sounds detected by the remote sensor 110. It should be noted, that the method 500 is only an example. Other example implementations are possible that include more or fewer operations than that shown in FIG. 5. In the particular example shown in FIG. 5, the method 500 can begin at box 520 in which local computer system 120 transmits a media signal to the remote sensor 110 over a communication link. As described herein, the media signal can include an audio signal component representation of audio sounds. The remote sensor 110 can receive the media signal and generate corresponding audio sounds on its component speaker 111. The communication link between the computer system 120 and remote sensor 110 can include a communication link in which the computer system 120 paired with remote sensor 110 using a Bluetooth™ or other wireless communication protocol. In some implementations, the link established between the local computer system 120 and the remote sensor 110 can be a bidirectional link. In other words, the local computer system 120 can send information to the remote sensor 110, and the remote sensor 110 can send information to the local computer system 120 either synchronously or asynchronously.

At box 520, the local computer system 120 can receive a sound signal from the remote sensor 110. The sound signal can correspond to ambient sound detected by the component microphone 112 in the remote sensor 110. As such, the sound signal can include any sounds emitted from the speaker 111 in the remote sensor 110 as well as any sounds detected in the vicinity of the remote sensor 110 (e.g., voices, street noise, music, etc.).

At box 530, the local computer system 120 can monitor the sound signal received from the remote sensor 110 and the media sent signal sent to the remote sensor 110 for recognizable voice commands. In some implementations, monitoring the sound signal and the media signal can include processing the sound signal. For example, to remove sounds generated by the speaker 111 and included in sound signal received from the remote sensor 110, the local computer system 120 can analyze the sound signal in view of the media signal sent to the remote sensor 110. Analysis of the sound signal can include subtracting an audio signal in the media signal from the sound signal received from the remote sensor 110. Subtraction of the audio signal from the sound signal can effectively remove some or all of the information attributable to sounds generated by the speaker 111 detected by the microphone 112 in the remote sensor 110. For example, if the remote sensor 110 is playing audio components of a sound track of a movie while a user utters a voice command (e.g. "pause movie", "rewind", "stop movie", etc.), the sounds of the soundtrack can be removed from the sound signal received from the remote sensor 110 to help isolate the voice command.

When a recognizable voice command is detected at box 530, the local computer system 120 can initiate commands to control various functionality of the local computer system 120 and/or any other devices coupled or in communication with the local computer system 120. For example, in response to a recognized voice command, the local computer system 120 can initiate a web search using a local or remote search engine that uses the information in the recognized voice command is input. In other examples, in response to a recognized voice command, the local computer system 120 can initiate commands to control home automation equipment in the physical installation location 105.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A computing device comprising:
a processor; and
a non-transitory computer readable medium coupled to the processor and comprising instructions that when executed by the processor cause the processor to:
establish a bi-directional wireless communication link between the computing device and a remote sensor comprising a speaker and a microphone, the remote sensor separate from the computing device;
transmit a first audio signal to the remote sensor for playback on the speaker;
receive a second audio signal from the microphone in the remote sensor;
process the second audio signal to generate a processed audio signal;
send the processed audio signal to a voice recognition routine to recognize a voice command within the processed audio signal; and
initiate an automation command controlling the first audio signal transmitted to the remote sensor for playback on the speaker, based on the recognized voice command,
wherein the processor is to process the second audio signal to generate the processed audio signal by:
detecting the first audio signal within the second audio signal;
determining a time delay between the first audio signal as transmitted to the remote sensor and the first audio signal as detected within the second audio signal;
time-shifting the first audio signal as detected within the second audio signal according to the determined time delay; and subtracting the time-shifted first audio signal as detected within the second audio signal from the second audio signal, and wherein the computing device is to both transmit the first audio signal to the remote sensor and receive back the second audio signal from the remote sensor.

2. The computing device of claim 1 wherein the second audio signal comprises ambient sounds detected by the microphone.

3. The computing device of claim 2 wherein the ambient sounds comprises the first audio signal played on the speaker.

4. A method comprising:

transmitting, by a computer system, for playback on a speaker of a remote sensor a first audio signal to the remote sensor over a bi-directional wireless communication link between the computer system and the remote sensor, the remote sensor separate from the computer system;

receiving, by the computer system, a second audio signal detected at a microphone of the remote sensor, the second audio signal received by the computing system from the remote sensor over the bi-directional wireless communication link;

processing, by the computer system, the second audio signal to generate a process audio signal;

recognizing, by the computer system, recognizable voice commands within the processed audio signal;

initiating, by the computer system, automation commands controlling the first audio signal transmitted to the remote sensor for playback on the speaker, based on the recognizable voice commands that have been recognized, wherein processing the second audio signal to generate the processed audio signal comprises:

detecting within the second audio signal a third audio signal transmitted to a second remote sensor for playback at the second remote sensor, the second audio signal different from the first audio signal;

detecting within the second audio signal the first audio signal; and subtracting the detected first audio signal and the detected third audio signal from the second audio signal, and wherein the computing system is to both transmit the first audio signal to the remote sensor and receive back the second audio signal from the remote sensor.

* * * * *